United States Patent [19]
Moreau et al.

[11] 4,161,652
[45] Jul. 17, 1979

[54] SYSTEM FOR OPTICALLY AIMING A LASER BEAM ON TO A TARGET

[75] Inventors: Bernard G. A. Moreau, Bagneux; René J. J. Jalin, Chatillon, both of France

[73] Assignee: Office National d'Etudes et de Recherches Aerospatiales, Chatillon, France

[21] Appl. No.: 863,234

[22] Filed: Dec. 22, 1977

[30] Foreign Application Priority Data

Dec. 24, 1976 [FR] France .................................. 76 39052
Dec. 15, 1977 [FR] France .................................. 77 37912

[51] Int. Cl.² .......................... G01B 11/26; G01J 1/20
[52] U.S. Cl. .................................. 250/203 R; 350/6.6; 356/152; 356/400
[58] Field of Search ...................... 250/203 R; 356/172, 356/152; 350/6.6

[56] References Cited
U.S. PATENT DOCUMENTS

| 2,010,016 | 8/1935 | French .............................. 350/6.6 X |
| 3,436,546 | 4/1969 | Derderian et al. ................. 350/6.6 X |
| 3,696,248 | 10/1972 | Cunningham et al. .......... 250/203 R |
| 3,917,381 | 11/1975 | Feigin .......................... 250/203 R X |
| 3,961,179 | 6/1976 | Kuffer .............................. 250/203 R |
| 4,063,819 | 12/1977 | Hayes ........................... 250/203 R X |

Primary Examiner—Palmer C. Demeo
Attorney, Agent, or Firm—Abraham A. Saffitz

[57] ABSTRACT

System for optically aiming a laser beam on to a target. The system comprises a mirror which reflects the laser beam towards the target and which is supported by a base by means of a pivot and first and second vibrating control members. This pivot and the control members together determine a first mirror rotation axis and a second mirror rotation axis perpendicular to the first axis. Means are provided for respectively generating a first and a second reference signals for driving the mirror. A laser radiation detector receives the laser radiation reflected by the target and produces a reception signal from which are derived first and second reaiming signal components. The first and second vibrating control members are operated by respectively the sum of the first reference signal and the first reaiming signal component and the sum of the second reference signal and the second reaiming signal component.

6 Claims, 14 Drawing Figures

SYSTEM FOR OPTICALLY AIMING A LASER BEAM ON TO A TARGET

BACKGROUND OF THE INVENTION

1. Field of the Invention

The invention relates to a system for automatically aiming a laser beam on to a target in order to permanently direct said beam on to said target.

The object of the invention is an aiming system of the aforesaid type which enables high precision aiming to be obtained. To give an idea, the angular precision of the aiming can be better than 50 milliradians with a response time of the order of 5 ms.

2. Description of the Prior Art

Laser beam applications require the highest possible aiming precision in order to obtain an intensity of the flux reflected by the target which is the largest possible for a given laser power.

Automatic aiming systems are already known consisting of a turret supporting the laser and directing it in accordance with a predetermined aiming programme. The aiming precision obtained is mediocre. Non-automatic aiming systems are also known comprising a mirror which reflects the laser beam towards the target, and means for rotatably vibrating the mirror about two perpendicular axes to modulate the luminous signal reflected by the target in order to facilitate the detection of said signal.

SUMMARY OF THE INVENTION

The laser beam optical aiming system according to the invention comprises a mirror which reflects the laser beam towards the target, a pivot for said mirror, a first and second member for controlling the angular position of the mirror to determine with the pivot a first mirror rotation axis and a second rotation axis perpendicular to the first respectively, a flux detector which receives the laser flux reflected by the target and delivers a reception signal, means for deriving from said reception signal a first and a second reaiming signal, and means for operating the first and second control members by the first and second reaiming signal respectively.

In a first embodiment of the system according to the invention, said system also comprises a first oscillator which delivers a first alternating reference signal at a first frequency, a second oscillator delivering a second alternating reference signal at a second frequency, means for operating the first control member by the first alternating signal and means for operating the second control member by the second alternating signal, said means for operating said first and second control members consisting of means for detecting the alternating component of the reception signal of the first frequency to deliver a first detection signal, and means for detecting the alternating component of the reception signal of the second frequency to deliver a second detection signal, said first detection signal constituting the first reaiming signal and said second detection signal constituting the second reaiming signal.

In a second embodiment of the system according to the invention, said system also comprises an oscillator which delivers an alternating reference signal, means for operating the control means by said alternating signal with a relative phase shift of $\pi/2$ and means for deriving the first and second reaiming signal from the amplitude and phase of the reception signal.

In a third embodiment of the system according to the invention, the means for deriving the reaiming signals from the reception signal comprises means for sampling the reception signal at a predetermined rate, coding means for converting the sampled signals into digital signals, means for calculating first and second digital control signals from said digital signals, and decoding means for converting said first and second digital control signals into a first analog reaiming signal and a second analog reaiming signal, for operating the first and second control members respectively.

In the three embodiments of the system according to the invention described heretofore, the control members are members of known type, for example stepping motor jacks. Advantageously, said members are constituted by supports made of piezo-electric material because of the speed of response of said supports to the signals which operate them.

BRIEF DESCRIPTION OF THE DRAWINGS

Further characteristics and advantages of the invention will be evident from the description given hereinafter of preferential forms of the three embodiments heretofore defined, with reference to the accompanying drawings in which.

Diagrams 8a, 8b, 8c and 8d of FIG. 8 represent the relative positions assumed successively by the centers of the target and the laser beam trace on the target during the reaiming operations executed by the circuits of FIG. 7.

DESCRIPTION OF THE PREFERRED EMBODIMENTS

It will be assumed in considering FIGS. 1 to 7 that the laser used is a $TEM_{OC}$ laser which delivers on emission an intensity I of Gaussian distribution which is a function of the radial distance from the axis of the laser beam. However it should be noted that the system according to the invention operates equally if the energy distribution is not Gaussian, the aiming precision being of the order of one half the radius of the laser spot on the target.

FIGS. 1 to 4 will be considered initially.

A $TEM_{OC}$ laser transmits an intensity I of Gaussian distribution which is a function of the radial distance from the laser beam axis:

$$I = I_o e^{-2\rho^2/\sigma^2}$$

where $\rho$ is the radial distance from the laser beam axis and $\sigma$ the width at $1/e^2$ of the Gaussian distribution curve.

The Gaussian curve is assumed truncated at the value $\rho = \sigma$. The transmitted power $P_e$ is then:

$$P_e = \frac{\pi \sigma^2}{2}\left(1 - \frac{1}{e^2}\right) = 0.865\, P$$

where P is the laser power.

The distribution of the illumination E in the plane of the target is little disturbed by this truncation and therefore as a first approximation remains Gaussian:

$$E = E_e e^{-2\rho'^2/\sigma'^2}$$

wherein:

$$E_e = P_e \times \frac{2\pi\sigma^2}{\lambda^2 L^2}, \text{ and } \sigma' = \frac{\lambda L}{\pi \sigma}$$

where
 $\rho'$ is the distance from the center of the laser spot,
 $\lambda$ the wavelength of the laser and L the propagation distance.

Let x and y be the coordinate of the center of the laser spot relative to coordinate axes Ox, Oy in the target plane. The error signal necessary for control is obtained by causing the laser spot to make two simultaneous periodical displacements about an equilibrium position $(x_o, y_o)$ relative to the Ox and Oy axes:

$$x = x_o + A \sin \omega_1 t$$

$$y = y_o + B \sin \omega_2 t$$

where A and B are the amplitudes of the vibrations and $\omega_1$ and $\omega_2$ the angular frequencies of the two movements. The control consists of correcting $x_o$ and $y_o$ until they cancel. The angular frequencies $\omega_1$ and $\omega_2$ are selected differently so as to be able to separate the control of $x_o$ from the control of $y_o$. It will be assumed hereinafter that $A = B$, so enabling the same aiming precision to be obtained for the two axes. However, it is equally possible for A and B to be different so as to obtain a different precision for each axis.

The signal received by the detector has the following form:

$$S = S_o\, e^{-\frac{2[(x_o + A \sin \omega_1 t)^2 + (y_o + A \sin \omega_2 t)^2]}{\sigma'^2}}$$

thus, by reduction:

$$S = S_o \times e^{-2(x^2_o + y^2_o)/\sigma'^2} \times e^{-2A^2(\sin^2 \omega_1 t + \sin^2 \omega_2 t)/\sigma'^2}$$

$$\times e^{-4A(x_o \sin \omega_1 t + y_o \sin \omega_2 t)/\sigma'^2}$$

In the operational case in which a precision of less than 50 microradians is required, A is small in comparison with $\sigma'$, and the signal reduces to the following sum:

$$S = S_o\, e^{-2(x^2_o + y^2_o)/\sigma'^2}\left[1 - \frac{2A^2}{\sigma'^2}(\sin^2 \omega_1 t + \sin^2 \omega_2 t)\right.$$

$$\left. - \frac{4A}{\sigma'^2}(x_o \sin \omega_1 t + y_o \sin \omega_2 t)\right]$$

The terms of higher order (in $A^2/\sigma'^4$ and above) are neglected. The components of the signal at frequencies O, $\omega_1/2\pi$, $\omega_2/2\pi$, $\omega_1/\pi$, $\omega_2/\pi$ are therefore as a first approximation:

$$C_o = S_o e^{(-2/\sigma'^2)(x^2_o + y^2_o)}$$

$$C_1 \sin \omega_1 t = -\frac{4A\, C_o\, x_o \sin \omega_1 t}{\sigma'^2} \quad (1)$$

$$C_2 \sin \omega_2 t = -\frac{4A\, C_o\, y_o \sin \omega_2 t}{\sigma'^2} \quad (2)$$

$$D_1 \cos 2\omega_1 t = \frac{A^2\, C_o \cos 2\omega_1 t}{\sigma'^2}$$

$$D_2 \cos 2\omega_2 t = \frac{A^2\, C_o \cos 2\omega_2 t}{\sigma'^2}$$

If one of the coordinates $(x_o, y_o)$ is negative, the component of the signal at the corresponding frequency is in phase with the excitation. It is of opposite phase if the coordinate is positive. The phase of the components at frequencies $\omega_1/\pi$ and $\omega_2/\pi$ does not depend on $x_o, y_o$.

In a first utilisation of the first embodiment of the aiming apparatus, the signals at angular frequencies $\omega_1$ and $\omega_2$ are detected synchronously by multiplying them by the reference signal $\sin \omega_1 t$ or $\sin \omega_2 t$ over a number N of periods of this signal. It is well known that:

$$\int_0^{2\pi N/\omega_1} \sin(\omega_1 t) \times \sin(\omega\, t)\, dt = O \text{ if } \omega/\omega_1$$

$$= \pi N/\omega_1 \text{ if } \omega = \omega_1$$

After synchronous detection, the error signals are therefore:

$$S_1(x_o) = -(\pi N/\omega_1)(4 A\, C_o\, x_o/\sigma'^2) = \quad (3)$$
$$-\frac{4\, N A\, S_o\, x_o}{\omega_1 \sigma'^2} e^{-2(x^2_o + y^2_o)/\sigma'^2}$$

$$S_2(y_o) = -(\pi N/\omega_2)(4 A\, C_o\, y_o/\sigma'^2) = \quad (4)$$
$$-\frac{4\, N A\, S_o\, y_o}{\omega_2 \sigma'^2} e^{-2(x^2_o + y^2_o)/\sigma'^2}$$

Curves (3) and (4), as a function of $x_o$ and $y_o$ respectively, are in the form of a Gauss curve derivative with the positive and negative maxima at $x_o = \pm \sigma'/2$ and $y_o = \pm \sigma'/2$ respectively.

$S_i$ (or $S_2$) tends towards zero when $x_o$ (or $y_o$) tends towards infinity. Control takes place only for $|x_o| < \sigma'/2$, and it is necessary to add to the aiming system a scanning system for acquiring the target.

Instead of synchronous detection, the amplitude of the signals detected at the modulation frequencies could be divided by the d.c. component, i.e. to give the following error signals:

$$T_1 = C_1/C_o = 4A x_o/\sigma'^2$$

$$T_2 = C_2/C_o = 4A y_o/\sigma'^2$$

These signals are proportional to $x_o$ and $y_o$ respectively for all values of $x_o$ and $y_o$.

Figure 1A:
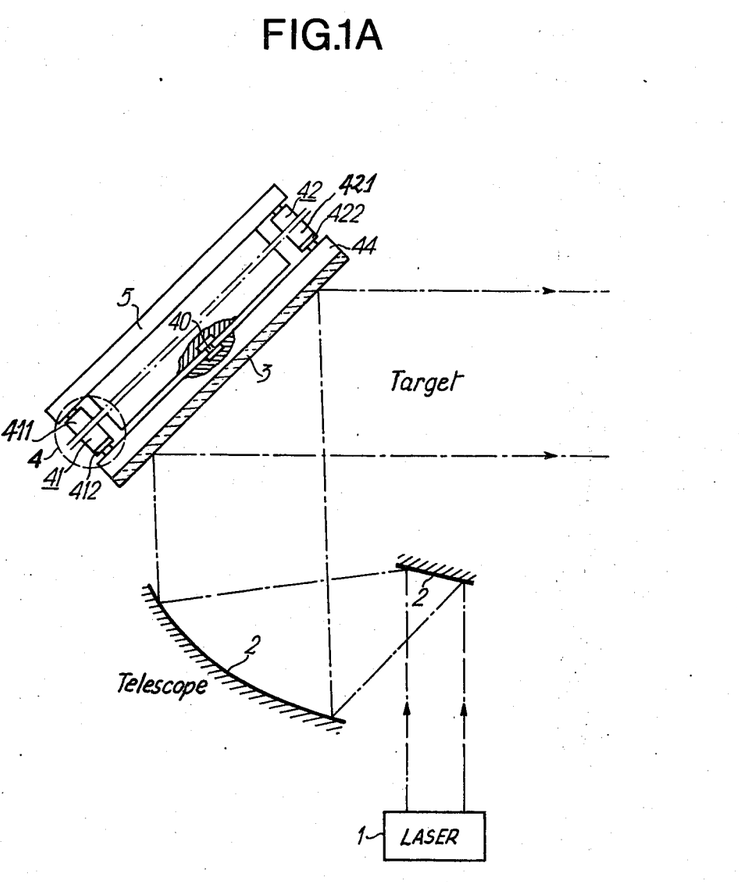
FIGS. 1A, 1B and 1C show said first embodiment of the aiming system according to the invention in the form of a block diagram.
Figure 1B:
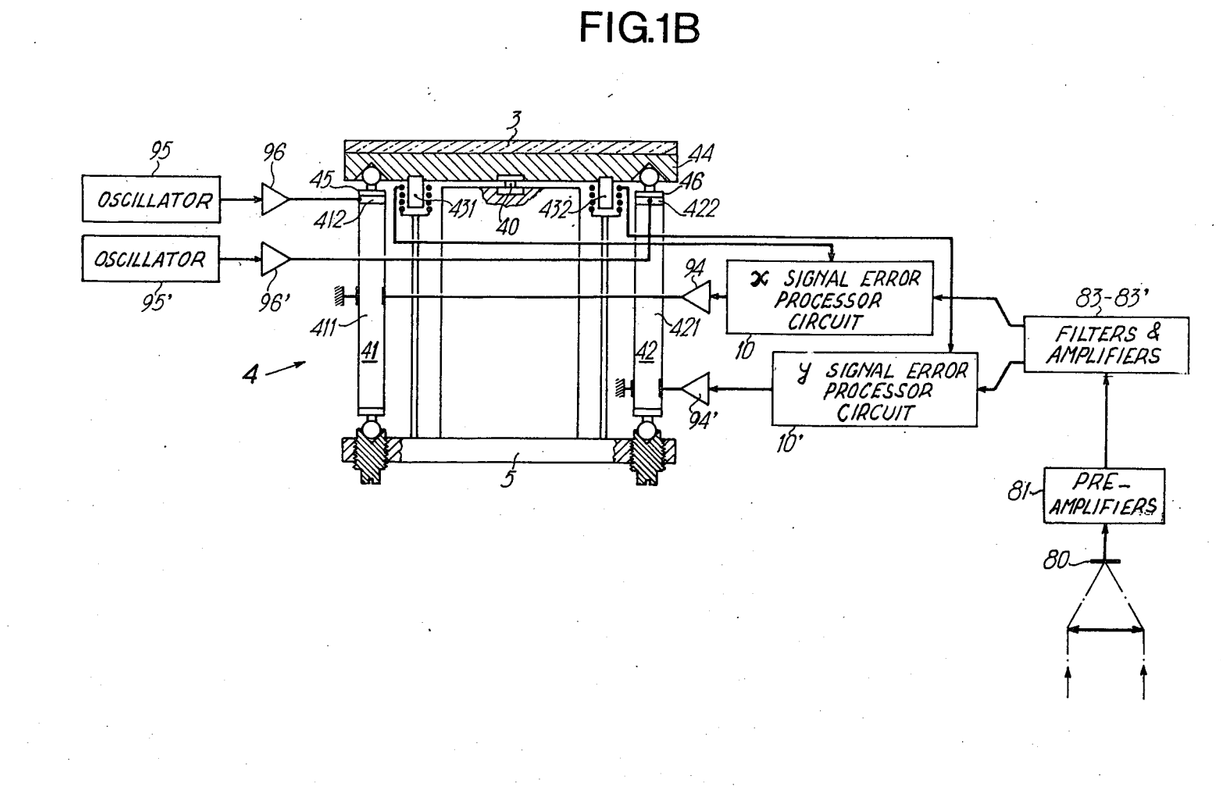
Figure 1C:
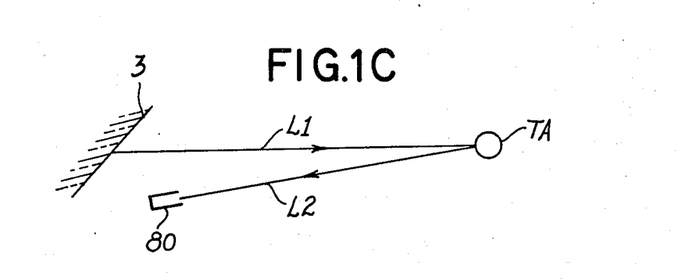
Figure 2A:
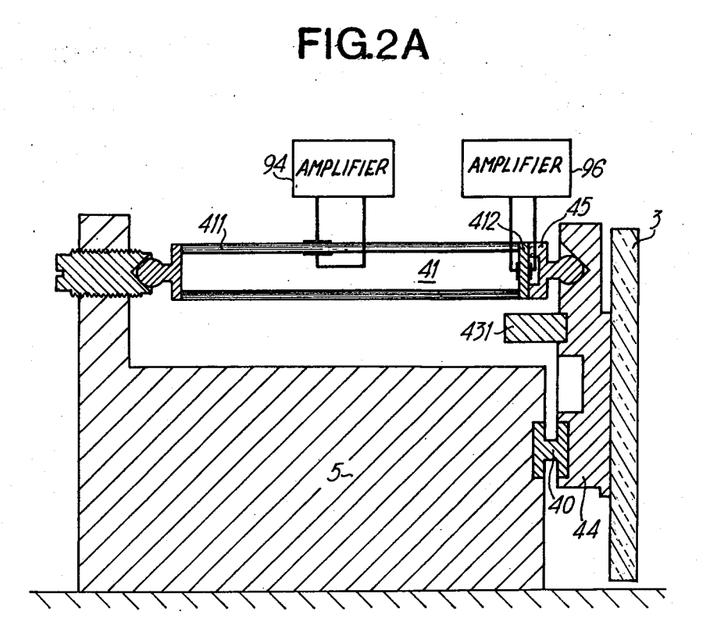
FIGS. 2A and 2B show the mirror and device for controlling the position of the mirror in the embodiment of FIGS. 1A and 1B.
Figure 2B:
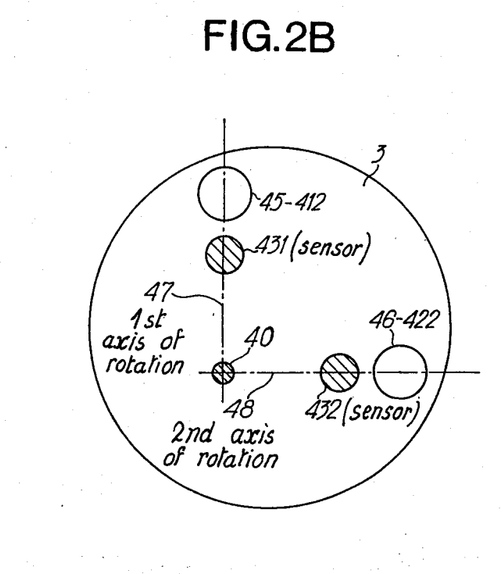

With reference to FIGS. 1A, 1B, 1C and 2A, 2B, the aiming device comprises a laser 1, a focusing telescope 2, a plane mirror 3 and a vibration and control device 4 for the mirror. The mirror 3 is secured to a positionable mounting 44 connected to a support 5 by three fixing points. One of the points is a flexible swivel joint 40 which serves as a pivot. The two other fixing points are constituted by piezo-electric ceramic stacks 41 and 42. Each stack (only one, 41, is shown in FIG. 2A) comprises a tubular piezo-electric ceramic column 411 which serves for the angular control adjustment, and a piezo-electric ceramic disc 412 which serves for giving the mirror a vibration about an axis, shown respectively at 412 and 422 on the stack 42. The discs 412 and 422 are connected to the mounting 44 by ball and socket joints 45 and 46. As shown in FIG. 2B, the axes of the columns and the centers of the discs form a right angle at the center of the swivel joint 40, so that the rotation transmitted to the mirror by the two tubular piezo-electric columns and the two discs is made about two perpendicular axes 47 and 48.

The piezo-electric discs 412 and 422 are controlled by two amplifiers 96 and 96' which amplify the signals provided by two quartz oscillators 95 and 95', to give voltages of about 2000 volts at frequencies $\omega_1/2\pi$ and $\omega_2/2\pi$ respectively. The tubular piezo-electric columns 411 and 421 are controlled by two amplifiers 94 and 94' which amplify the suitably processed error signals to an average level of 1500 volts.

Sensors 431 and 432, of which the armatures are carried by the mirror mounting 44 and the coils by the support 5, enable the reference signals at frequencies $\omega_1/2\pi$ and $\omega_2/2\pi$ to be collected.

The receiver for the reflected ray is common to the two paths x and y. It comprises (FIG. 3) a radiation detector 80 and a preamplifier 81. As it can be seen in FIG. 1C, the mirror 3 and the detector 80 are near each other and aim the target TA, L1 being the aim axis of mirror and L2 the aim axis of detector 80. In reality, said axes are substantially parallel because of the distance of the target TA. The preamplifier 81 is connected both to a threshold comparator 82 which controls the stoppage of the aiming device below a certain reflected radiation level, and to two band pass filter amplifiers 83 and 83' set respectively to the angular frequencies $\omega_1$ and $\omega_2$ which separate the $x_o$ error signals from the $y_o$ error signals. From each of these filter amplifiers there extends a processing chain for the error signal, namely 10 for the $x_o$ error signal and 10' for the $y_o$ error signal. Only one of these two chains, namely that relative to the $x_o$ signal, will be described. The second is identical and its components have the same reference numerals as those of the first chain, but carry an apostrophe. The processing chain for the $x_o$ error signal comprises an amplifier 84 for the reference signal of frequency $\omega_1/2\pi$ originating from the sensor 431, an analog multiplier for the filtered error signal and the reference signal 85, an integrator 86, a memory sampler 87, a voltage controlled oscillator 88, a sign detector 89 the purpose of which is to determine the polarity of the synchronously detected error signal, a counter-decounter 90 preceded by two AND gates 91 and 92 which give access to the counting and decounting inputs of the counter-decounter and are controlled by the sign detector, a digital analog converter 93 and a high voltage amplifier 94. This high voltage amplifier 94 controls the piezo-electric column 411.

Figure 3:
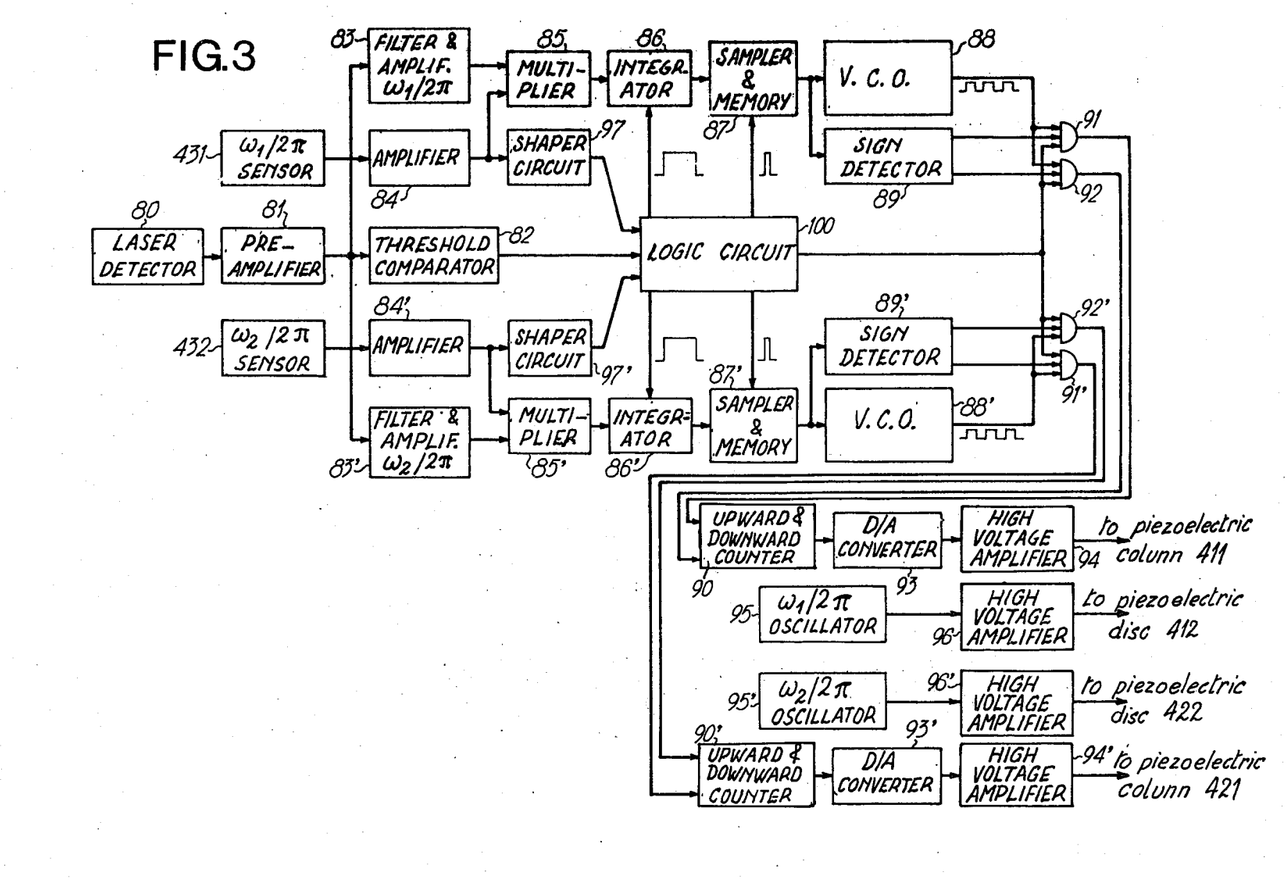
FIG. 3 is a schematic diagram of a first embodiment of the electrical circuits of said embodiment.

The signals from the sensors 431 and 432 are amplified in the amplifiers 84 and 84', fed in the form of rectangular pulses into the shaper circuits 97 and 97', and then fed to a logic circuit 100. The output from the threshold comparator 82 is connected to this logic circuit in order to inhibit it when the detected reflected signal is less than the threshold value. The logic circuit 100 controls the duration of integration during which the integrators 86 and 86' operate, and the discharge from these integrators, the times of sampling of the samplers 87 and 87' and the emptying of the memories associated with these samplers, the duration of opening of the gates 91, 91', 92, 92' and the resetting to zero of the counter-decounters.

Figure 4:
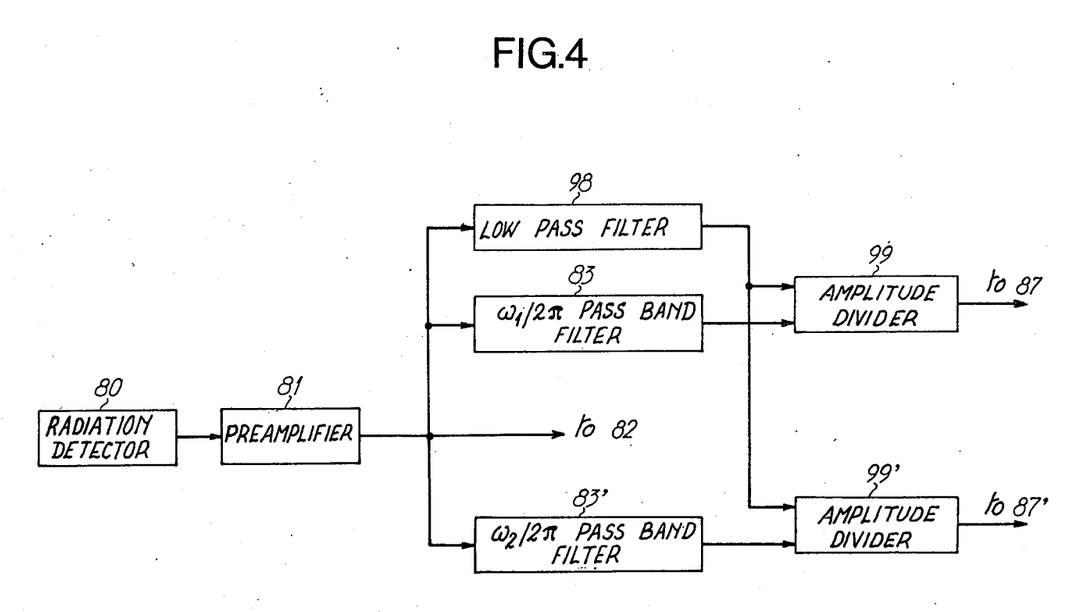
FIG. 4 is a schematic diagram of a second arrangement of the electrical circuits of said embodiment.

With reference to FIG. 4, the signal leaving the preamplifier 81 is fed to a low pass filter 98 and two band pass filters 83 and 83', the former tuned to the angular frequency $\omega_1$ and the latter to the angular frequency $\omega_2$. The outputs of the filters 98 and 83 are fed to an analog divider 99, and the outputs from the filters 98 and 83' are fed to an analog divider 99', these dividers producing signals $T_1$ and $T_2$ defined heretofore. The outputs from the analog dividers 99 and 99' are connected respectively to the memory samplers 87 and 87'. The remainder of the processing chains is as shown in FIG. 3.

In a prototype constructed by the Applicants, the elements of the aiming system had the following dimensions and characteristics:

distance between the axis of the ceramics and the swivel joint 40: 5 cm

| Tubes 411–421 of piezo-electric ceramic | |
|---|---|
| length | 9 cm |
| thickness | 2 mm |
| outer radius | 7 mm |
| density | 7.1 |
| permittivity | 1600 |
| Young's modulus | $55.10^9$ N/m$^2$ |
| relative extension | $-200.10^{-12}$ m/V |
| Piezo-electric discs 412–422 | |
| thickness | 3 mm |
| outer radius | 8 mm |
| density | 7.1 |
| permittivity | 1600 |
| Young's modulus | $50.10^9$ N/m$^2$ |
| relative extension | $480.10^{-12}$ m/V |
| Mirror | |
| thickness | 1 cm |
| radius | 5 cm |
| material | optical glass |
| Flexible swivel joint 40 | |
| return torque | $1.14.10^4$ m.N/rad |
| material | steel |
| Resonance frequency of the mirror alone | |
| about 800 Hz | |
| Sensor-accelerometers 431–432 for obtaining the reference | |
| Hexagon 23 mm long and 10 mm wide | |
| range 50 000–20 000 g | |
| sensitivity | 0.06 g |
| inherent frequency | 40 kHz |
| rising time | 10 μs |
| Photodetectors 80 | |
| passing band | 1 MHz |
| noise equivalent (NEP) | $10^{-13}$ W/(Hz)$^{\frac{1}{2}}$ |

Figure 5:
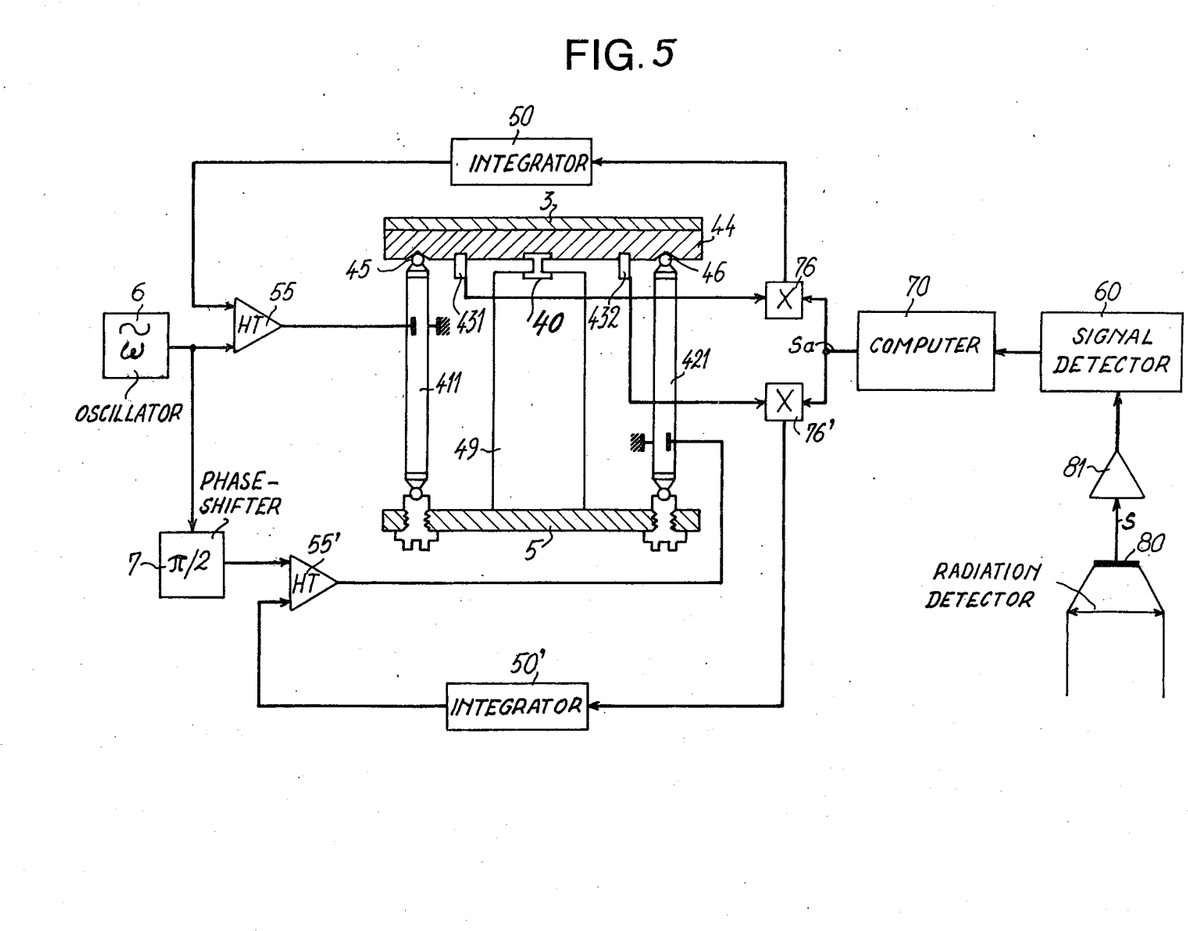
FIG. 5 shows the second embodiment of the aiming system according to the invention in the form of a block diagram.

Reference will now be made to FIG. 5, which relates to the second embodiment of the system according to the invention. This shows:

the mirror 3, its positionable mounting 44 and mounting support 5;

the flexible swivel joint 40 constituting the pivot for the mounting 44 and connected to the support 5 by a rigid stand 49;

two tubular piezo-electric columns 411 and 421 on which the mounting 44 rests via two swivel joints 45 and 46.

The mirror position is determined by two axes, namely the x axis passing through the swivel joint 40 and swivel joint 45, and the y axis passing through the swivel joint 40 and swivel joint 46. These axes are orthogonal to each other.

The accelerometric sensors 431 and 432 are connected to the mounting 44 along the one and the other axis respectively. The piezo-electric discs 412 and 422 one of which is inserted between the swivel joint 45 and column 411 and the other between the swivel joint 46 and column 421, are not shown in FIG. 5.

Also shown are the radiation detector 80 which receives the luminous flux reflected by the target struck by the laser beam, and the preamplifier 81 which adapts the level of the output signal from said detector.

The system shown in FIG. 5 also comprises:

a signal detection chain 60, the input of which is connected to the output of the preamplifier 81, its outputs delivering signals Smax, Smin and Tmax, the meaning of which will be given hereinafter;

a calculator 70, the signal inputs of which are connected to the outputs of the detection chain 60, its output delivering a control signal Sa;

a first multiplier 76, the two inputs of which are connected respectively to the output of the sensor 431 and to the output of the calculator 70, and which delivers a first control signal which is the product of the signal SIN delivered by said sensor 431 and the control signal Sa;

a second multiplier 76', the two inputs of which are connected respectively to the output of the sensor 432 and to the output of the calculator 70, and which delivers a control signal which is the product of the COS signal delivered by said sensor 432 and said control signal Sa;

a first integration circuit 50, the input of which is connected to the output of the multiplier 76;

a second integration circuit 50', the input of which is connected to the output of the multiplier 76';

a generator 6 for generating an alternating signal of angular frequency ω;

a phase-shifter 7 connected to the output of the generator 6 to shift the phase of said signal by π/2;

a first high voltage differential amplifier 55, the two inputs of which are connected respectively to the output of the integration circuit 50 and the output of the generator 6;

a second high voltage differential amplifier 55', the two inputs of which are connected respectively to the output of the integration circuit 50' and the output of the dephaser 7.

Thus the position of the swivel joint 45 is controlled by a first control chain comprising the sensor 431, the multiplier 76, the integration circuit 50, the amplifier 55 and the piezo-electric column 411. The position of the swivel joint 46 is controlled by a second control chain comprising the sensor 432, the multiplier 76', the integration circuit 50', the amplifier 55' and the piezo-electric column 421.

If there are no signals delivered by the multipliers 76 and 76', the amplifiers 55 and 55' impose on the two columns 411 and 421 vibratory deformations which cause the mirror 3 to make oscillations about the two orthogonal axes defined heretofore which are of the same angular frequency but displaced in phase by π/2, so that the laser spot describes an elliptical Lissajoux trajectory on the target. Said trajectory is obviously circular if the output signals from the two amplifiers 55 and 55' have the same amplitude and if the two piezo-electric columns are identical.

The luminous signal S received by the radiation detector 80 is thus an amplitude modulated alternating signal the average level of which is a decreasing function of the distance from the system to the target and the deviation of the center of the target from the laser spot on the target. The phase of the carrier of said signal is a function of the direction of this deviation. In other words, during each period of the carrier, i.e. one period of the trajectory of the laser spot in the plane of the target, the level of the signal S assumes an instantaneous maximum value Smax at a time Tmax, and an instantaneous minimum value Smin at a time Tmin. The position of these times relative to a determined origin in the period is a measure of a dihedron the edge of which is constituted by the axis joining the mirror 3 to the center of the target, one plane (the reference plane) of which passes through the one or other axis of rotation of the mirror, and the other plane (the measuring plane) of which passes through the radius joining the center of the target to the center of the laser spot. The value of the difference Smax−Smin enables a determination to be made of the amplitude of the correction to be applied to the direction of the mirror 3 by the effect of the two piezo-electric supports 411 and 421. The signal S therefore contains all the the information necessary to enable a digital calculator to control the correction inputs of the amplifiers 70 and 70'.

The explanation given heretofore does not depend upon the distribution of energy in the section of the laser beam or in the laser spot. It is valid both for a Gaussian distribution and for any other distribution. The accuracy of the measurement and the aiming correction is in fact linked to the radius of the laser spot, a typical aiming deviation being of the order of one half of this radius.

Figure 6:
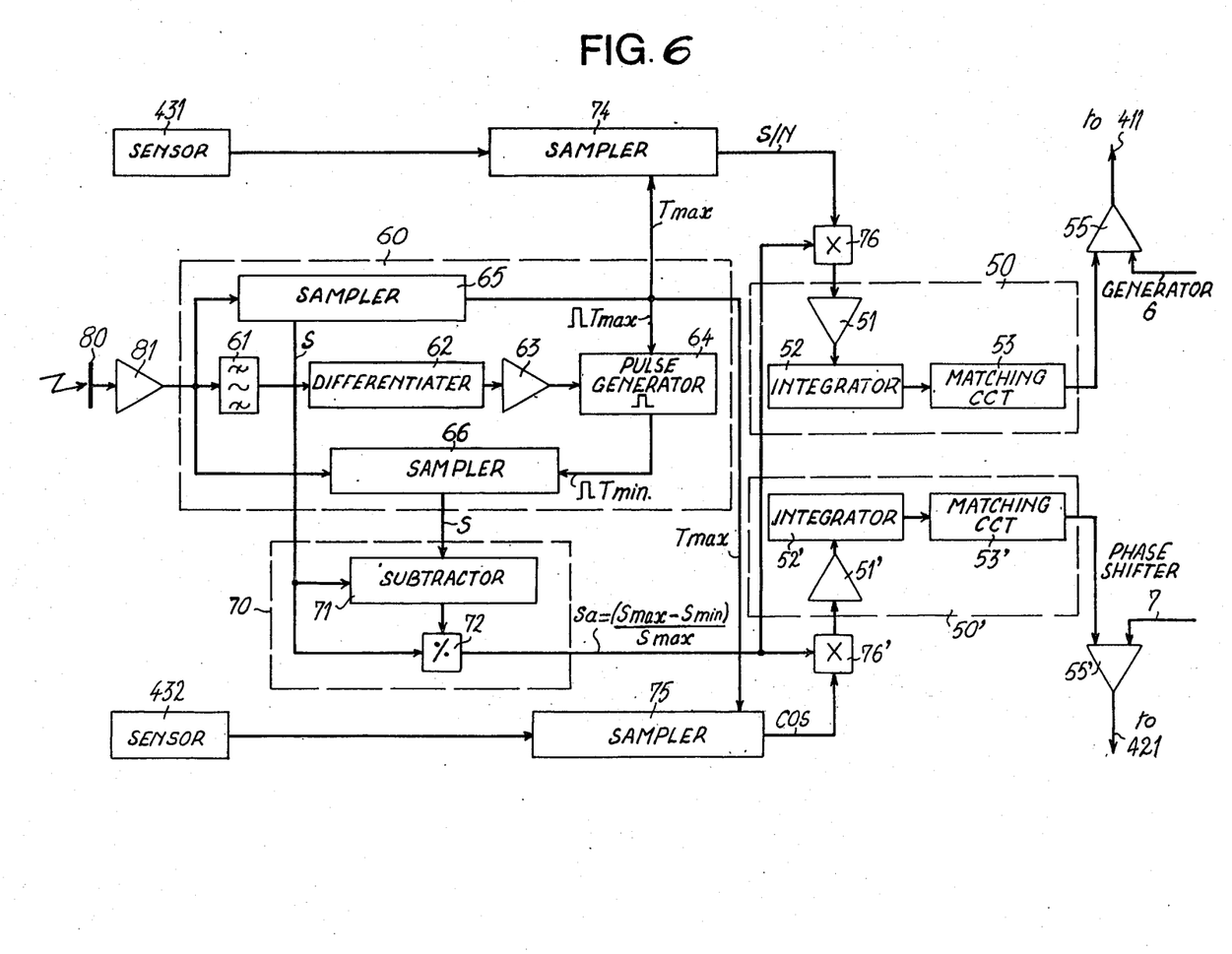
FIG. 6 is an electrical schematic diagram of the circuits of said second embodiment.

FIG. 6, relating to an embodiment of the circuits of FIG. 5, will now be considered:

The detection sub-assembly 60 comprises:

a band pass filter 61 tuned to the angular frequency ω and having its input connected to the output of the preamplifier 81;

a differentiator circuit 62, the input of which is connected to the output of the filter 61;

a pulse generator 64, the input of which is connected to the output of the differentiator circuit 62 via an amplifier 63, its purpose being to deliver at a first output a pulse Tmax corresponding to the time at which the extreme value of S is a maximum Smax, or at a second output a pulse Tmin corresponding to the time at which the extreme value of S is a minimum Smin, each time the differentiated output signal of the circuit 62 assumes a zero value;

a first sampler 65 connected to the output of the preamplifier 81 by a signal input and to the output Tmax of the generator 64 by a control pulse input to transmit a sample Smax of the output signal of said preamplifier each time it receives the pulse Tmax;

a second sampler 66 connected to the output of the preamplifier 81 by a signal input and to the output Tmin of the generator 64 by a control pulse input to transmit a sample Smin of the output signal of said preamplifier each time it receives the pulse Tmin.

The calculator 70 comprises both a subtractor 71, the two inputs of which are connected respectively to the outputs of the samplers 65 and 66, and a divider 72, the dividend signal input of which is connected to the output of the subtractor 71 and the divisor signal input of which is connected to the output of the sampler 65. The level of the output signal Sa of said divider 72 consequently measures the quotient (Smax−Smin)/Smax.

The output of the accelerometer 431 is connected to the signal input of a sampler 74 (so-called "sine taker"), the control input of which is connected to the Tmax output of the generator 64 to transmit the value (so-called SIN signal) assumed by the output signal of said accelerometer 431 at the time of the Tmax pulse. The output of the accelerometer 432 is connected to the signal input of a sampler 75 (so-called "cosine taker"), the control input of which is connected to the Tmax output of the generator 64 to transmit the value (so-called COS signal) assumed by the output signal of said accelerometer 432 at the time of the Tmax pulse.

The two inputs of the multiplier 76 are connected respectively to the output of the sampler 74 and the output of the divider 72, while the two inputs of the multiplier 76' are connected respectively to the output of the sampler 75 and to the output of the divider 72.

The integration circuit 50 connected to the output of the multiplier 76, and the integration circuit 50' connected to the output of the multiplier 76' each comprise a variable gain amplifier 51 (51') for level adjustment, an integrator 52 (52') for determining the processing period of the control signal to be applied to each piezoelectric column 411 (421) and, if required an adaptor 53 (53'). As already seen, the output signal of the circuit 50 is fed to one of the inputs of the amplifier 55, and the output signal of the circuit 50' is fed to one of the inputs of the amplifier 55'.

A brief calculation shows that the control voltages fed respectively to the columns 411 and 421 by the amplifiers 55 and 55' depend only on the magnitude and direction of the average deviation between the center of the target and the center of the laser spot.

As the signals fed to the piezo-electric columns 411 and 421 are in phase quadrature, the trajectory of the spot center in the plane of the target is given by the equations:

$$x = x_o + A \sin(\omega t) \quad (5)$$

$$y = y_o + A \cos(\omega t) \quad (6)$$

where x and y are the Cartesian coordinates of the spot center relative to the target center, $x_o$ and $y_o$ are their non-modulated components, A the amplitude of the movement conferred on the laser spot by the modulation, $\omega$ its angular frequency and t the time.

If a Gaussian energy distribution is assumed in the laser spot, the level of the signal received by the radiation detector 81 is given by a product of the form:

$$S = S_o \cdot e^{-2(x_o^2 + y_o^2 + A^2)/\sigma^2} \times e^{-4(x_o \sin \omega t + y_o \cos \omega t)/\sigma^2} \quad (7)$$

where $\sigma$ is the distance between the system and the target. The second exponential factor expresses the effect of the modulation. The maximum and minimum values of this second factor correspond to the time Tmax and Tmin, for which:

$$tg(\omega t) = y_o/x_o \quad (8)$$

From equations (3) and (4):

$$Smax = S_o \cdot e^{(-2\rho_o^2 - 2A^2 + 4A\rho_o)/\sigma^2} \quad (9)$$

$$Smin = S_o \cdot e^{(-2\rho_o^2 - 2A^2 - 4A\rho_o)/\sigma^2} \quad (10)$$

The value of the control signal:

$$Sa = (Smax - Smin)/Smax \quad (11)$$

delivered by the divider 72 becomes:

$$Sa = 1 - e^{-8A\rho_o/\sigma^2} \quad (12)$$

This value depends only on the distance $\rho_o$ between the target center and the center of the laser spot.

The two multipliers 76 and 76' enable rotational speeds to be impressed on the mirror 3 about its two orthogonal rotation axes of the following values:

$$dx_o/dt = g \cdot Sa \cdot \sin(\omega \cdot Tmax) \quad (13)$$

and $$dy_o/dt = g \cdot Sa \cdot \cos(\omega \cdot Tmax) \quad (14)$$

By modifying the schematic arrangement of FIG. 6, it would be possible to use other methods for determining the control signal, given for example by the equations:

$$Sa = Smax - Smin \quad (15)$$

$$Sa = \text{Log}(Smax/Smin) = 8A\rho_o/\sigma^2 \quad (16)$$

in which the value of Sa depends only on the distance between the target center and the center of the laser spot.

All the circuits of the schematic diagram of FIG. 6 may be analog circuits, in particular where it is required that the signal Sa is processed as quickly as possible (the minimum time of processing, controlled by the integrator 52, being obviously one period of the modulation signal). However, if a longer integration time can be tolerated, the functions of the calculator 70, the multipliers 76 and 76' and the integration circuits 50 and 50' may be performed by means of digital calculators such as microprocessors which enable other information to be obtained at the same time, such as a prediction of the speed or acceleration.

It has been stated that the differential amplifiers 55 and 55' enable the sum of the modulation signals and position correction signals to be fed to the piezo-electric columns 411 and 421. However, these functions could be separated by mechanically disposing, in series with said columns, piezo-electric supports such as the discs 412, 422. Separate amplifiers then enable correction signals to be fed to the columns and modulation signals to be fed to the discs.

Conversely, it will be noted that in the first embodiment it is possible to dispense with the piezo-electric discs 412 and 422, and to feed the sum of the position correction signals and corresponding modulation signals to the columns 411 and 421 respectively, via operational amplifiers analogous to the amplifiers 55 and 55' of the present embodiment.

Figure 7:
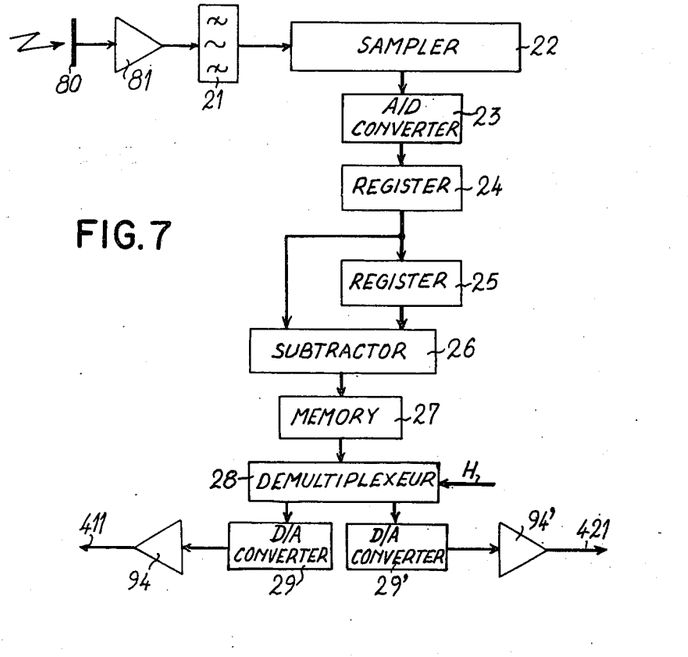
FIG. 7 is a functional diagram of the circuits of the third embodiment of the aiming system according to the invention.

Reference will now be made to FIG. 7, which shows a functional diagram of the third embodiment of the device according to the invention for controlling the piezo-electric supports 411 and 421 by a digital calculator, by directly utilising the reception signal delivered by the detector 80. No alternating modulation signal is fed to said supports.

For simplicity, the synchronization members and connections for the calculation and memory sequences are omitted. The parallel connections for transferring the digital word bits are represented in the form of simple connections.

As in the case of the schematic diagrams of the other embodiments, the schematic diagram of FIG. 7 shows the radiation detector 80 and its output preamplifier 81, together with the high voltage amplifiers 94 and 94' which respectively deliver the control voltages for the columns 411 and 421 which operate the mirror 3 in the planes x and y respectively.

After filtering by a low pass filter 21, the analog output signal from the preamplifier 81 is fed to the input of a sampler 22. The samples are converted into digital signals by a coder 23. The outputs from this latter are connected to the inputs of a first buffer register 24, the outputs of which are connected to the inputs of a second buffer register 25 and to a first group of inputs of a subtractor 26. The outputs of the buffer register 25 are connected to the second group of inputs of said subtractor. This latter delivers the difference between the contents of the two registers 24 and 25 to a memory 27.

Depending on the value assumed alternately by a logic control signal which it receives from the time base (not shown) of the calculator via a connection H, a switching circuit 28 delivers words which it receives from the memory 27, either to a first digital-to-analog converter 29, the output of which is connected to the input of the amplifier 94 controlling the piezo-electric support 411, or to a second digital-to-analog converter 29', the output of which is connected to the input of the ampifier 94' controlling the support 421.

Reference will now be made simultaneously to FIG. 7 and the diagrams 8a, 8b, 8c and 8d of FIG. 8, which show the successive relative positions in the field of the detector 80 which are assumed by the center T of the laser spot relative to the center C of the target, during one operating sequence of the calculator. It will be assumed that the rotational x-axis of the mirror 3 (not shown) is horizontal and the y-axis is vertical. During each sequence the target C may be considered to be practically immobile in the field because of the rapidity of execution of the various stages of the sequence. For simplicity, the same references have been assigned to the distances between the centers C and T as to the corresponding samples of the reception signal delivered by the detector 80.

Figure 8A:
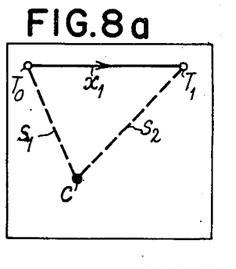

The diagram 8a shows the first stage. The sampler 22 delivers a sample S1 corresponding to the distance of the center T of the laser spot (in a position $T_o$ which it occupies at the time of sampling) from the target center C. The register 24 is then occupied by the word S1. The memory 27 then delivers via the switching circuit 28 a word x1 of predetermined value to the converter 29, which imposes on the center T of the laser spot a displacement x1 parallel to the x-axis, which brings it to T1. The sample S2 corresponding to the new position T1 of the center T is delivered by the sampler, and the corresponding word is registered in the register 24, where it takes the place of the word S1 which is transferred into the register 25. The difference S2−S1 is then registered in the memory 27.

Figure 8B:
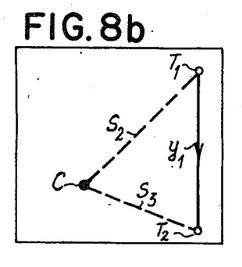

Reference will now be made to diagram 8b. The memory 27 delivers to the amplifier 94' a control signal y1 which gives the center T of the laser spot a displacement y1 parallel to the y-axis, which transfers T from the position T1 to the position T2. By means of the sampler 22 and coder 23, a word S3 corresponding to the distance T2, C is registered in the register 24, while the word S2 is transferred into the register 25. The subtractor 26 then calculates the difference S3−S2, which is registered in the memory 27.

Figure 8C:
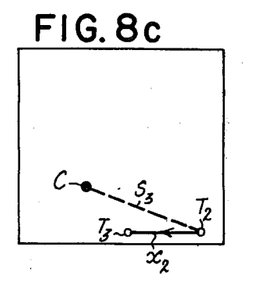
Figure 8D:
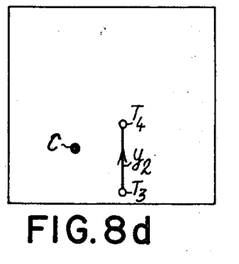

Via the switching circuit 28, said memory 27 then delivers the difference S2−S1, which gives the center T a correction displacement x2 (diagram 8c) parallel to the x-axis, to move the center T from the position T2 to the position T3. Via the circuit 28, the memory 27 then delivers the difference S3−S2, which gives T a displacement y2 (diagram 8d) parallel to the y axis, to move T from T3 and T4.

The sequence has terminated, and the calculator is reset to begin a new sequence if required. Thus, the calculator of FIG. 7, by means of successive linear interpolations, enables the center T of the laser spot to be moved towards the center C of the target with an error which is sufficiently small to enable it to be considered that coincidence has been obtained. The subtractor 26 could be replaced by a calculation circuit enabling the correction signals to be processed by means of a program which uses a non-linear relationship between the signals successively present in the registers 24 and 25, this relationship taking account of the characteristics of the target (size, shape, albedo) and the energy distribution in the laser spot.

The diagram of FIG. 7 is a functional diagram. The various functions which it illustrates may be effected either by means of a wired program or by means of a microprocessor, the arithmetical and logic unit of which effects the functions performed by the subtractor 26 (or by an analogue circuit) and by the switching circuit 28, whereas its memory unit effects the functions performed by the registers 24 and 25 and by the memory 27.

What we claim is:

1. A system for optically aiming a laser beam on to a target comprising:

a mirror which reflects the laser beam towards the target;

a pivot for said mirror;

first and second vibrating control members for determining with the pivot a first mirror rotation axis and a second mirror rotation axis perpendicular to the first axis and controlling the angular position of the mirror around said axes;

first and second means for respectively generating a first reference signal having a given frequency and a second reference signal having the same frequency as the first reference signal and in phase-quadrature therewith;

a laser radiation detector receiving the laser radiation reflected by the target and producing a reception signal;

sensor means for detecting the angular positions of the mirror around said first and second rotation axes and generating first and second mirror position signals;

means for differentiating the reception signal and detecting the zeros of the reception differentiated signal;

means for producing timing pulses coinciding with the zeros of said reception differentiated signal;

means for sampling the first and second mirror position signals and the reception signal by said timing pulses whereby forming signals proportional to the maximum and to the minimum of the reception signal;

computer means for forming the difference of said maximum proportional reception signal and minimum proportional reception signal and the ratio of said difference to the maximum proportional reception signal, whereby obtaining a resulting signal;

means for multiplying said resulting signal by respectively said first and second sampled mirror position signals, whereby obtaining first and second multiplied signals;

means for synchronously detecting said first and second multiplied signals by respectively said first and second reference signals whereby obtaining first and second reaiming signal components; and means for operating said first and second vibrating control members by respectively the sum of the first reference signal and the first reaiming signal component and the sum of the second reference signal and the second reaiming signal component.

2. A system for optically aiming a laser beam on to a target comprising:

a mirror which reflects the laser beam towards the target;

a pivot for said mirror;

first and second vibrating control members for determining with the pivot a first mirror rotation axis and a second mirror rotation axis perpendicular to the first axis and controlling the angular position of the mirror around said axes;

means for generating a first reference signal having a first predetermined frequency;

means for generating a second reference signal having a second predetermined frequency, different from said first frequency;

a laser radiation detector receiving the laser radiation reflected by the target and producing a reception signal;

two pass band filters respectively tuned to said first and second frequency and both filtering said reception signal for respectively delivering a first and a second re-aiming signal components; and means for operating said first and second vibrating control members by respectively the sum of the first reference signal and the first re-aiming signal component and the sum of the second reference signal and the second re-aiming signal component.

3. An aiming system as claimed in claim 2 wherein the first and second vibrating control members are constituted respectively by a first and second support of piezo-electric material.

4. A system for optically aiming a laser beam on to a target comprising:

a mirror which reflects the laser beam toward the target;

a pivot for said mirror;

first and second vibrating control members for determining with the pivot a first mirror rotation axis and a second mirror rotation axis perpendicular to the first axis and controlling the angular position of the mirror around said axes;

means for generating a first reference signal having a given frequency and a second reference signal having the same given frequency and in phase-quadrature with the first reference signal;

a laser radiation detector receiving the laser radiation reflected by the target and producing a reception signal;

two synchronous detectors both receiving the reception signal and respectively receiving said first and second reference signals for respectively delivering a first and second re-aiming signal component; and means for operating said first and second vibrating control members by respectively the sum of the first reference signal and the first re-aiming signal component and the sum of the second reference signal and the second re-aiming signal component.

5. An aiming system as claimed in claim 4 wherein the first and second vibrating control members are constituted respectively by a first and second support of piezo-electric material.

6. A system for optically aiming a laser beam on to a target comprising:

a mirror which reflects the laser beam towards the target;

a pivot for said mirror;

first and second means for respectively generating a first and a second reference signal;

a laser radiation detector receiving the laser radiation reflected by the target and producing a reception signal;

means for deriving from said reception signal first and second re-aiming signal components;

a first vibrating control member for determining with the pivot a first mirror rotation axis, said control member comprising a first support of piezo-electric material operated by the first reference signal and a second support of piezo-electric material operated by the first re-aiming signal component; and a second vibrating control member for determining with the pivot a second mirror rotation axis, said control member comprising a third support of piezo-electric material operated by the second reference signal and a fourth support of piezo-electric material operated by the second re-aiming signal component.

* * * * *